US00RE44575E

(19) United States
(12) Reissued Patent
Seraphim et al.

(10) Patent Number: US RE44,575 E
(45) Date of Reissued Patent: Nov. 5, 2013

(54) BACK LIGHT ASSEMBLY FOR USE WITH BACK-TO-BACK FLAT-PANEL DISPLAYS

(75) Inventors: Donald P. Seraphim, Vestal, NY (US); Dean W. Skinner, Beverly Hills, FL (US)

(73) Assignee: Seiko Epson Corporation, Tokyo (JP)

(21) Appl. No.: 13/329,051

(22) Filed: Dec. 16, 2011

Related U.S. Patent Documents

Reissue of:
(64) Patent No.: 6,578,985
Issued: Jun. 17, 2003
Appl. No.: 09/906,691
Filed: Jul. 18, 2001

U.S. Applications:
(60) Continuation of application No. 11/882,394, filed on Aug. 1, 2007, now Pat. No. Re. 43,125, which is a division of application No. 11/154,995, filed on Jun. 17, 2005, now Pat. No. Re. 40,355.

(51) Int. Cl.
*F21V 13/00* (2006.01)

(52) U.S. Cl.
USPC ..... 362/243; 349/64; 359/599; 362/97.1; 362/97.2; 362/290; 362/330; 362/342

(58) Field of Classification Search
USPC ..... 362/26, 27, 97.1–97.3, 243, 255, 290, 362/294, 330, 342, 606, 607, 23.09, 23.1, 362/23.16, 23.17; 349/60–64, 66, 68, 70, 349/71, 73; 40/572; 359/599
See application file for complete search history.

(56) References Cited

U.S. PATENT DOCUMENTS

| | | | |
|---|---|---|---|
| 5,381,309 | A | 1/1995 | Borchardt |
| 5,565,903 | A | 10/1996 | Ueda |
| 5,661,531 | A | 8/1997 | Greene et al. |
| 5,867,236 | A | 2/1999 | Babuka et al. |
| 5,883,684 | A | 3/1999 | Millikan et al. |
| 5,903,328 | A | 5/1999 | Greene et al. |
| 6,152,580 | A | 11/2000 | Babuka et al. |
| 6,204,899 | B1 | 3/2001 | Hall |
| 6,341,879 | B1 | 1/2002 | Skinner et al. |
| 6,417,832 | B1 | 7/2002 | Skinner et al. |
| 6,447,146 | B1 | 9/2002 | Skinner et al. |
| 6,657,698 | B1 | 12/2003 | Greene et al. |
| 6,680,761 | B1 | 1/2004 | Greene et al. |
| RE40,355 | E | 6/2008 | Seraphim et al. |
| RE42,975 | E | 11/2011 | Seraphim et al. |
| 2002/0011016 | A1 | 1/2002 | Aeling |

*Primary Examiner* — Stephen F Husar
(74) *Attorney, Agent, or Firm* — Oliff & Berridge, PLC

(57) ABSTRACT

The present invention features a system for uniformly distributing luminance and a high degree of collimation from a back light module for flat-panel, liquid crystal displays (LCDs) simultaneously. A constant and uniform luminance output of the back light module in two directions is obtained through appropriate selection of lamps, geometry and optical components. An appropriate balance of lamps, lamp spacing, diffusers and light collimating optics are chosen to produce a high brightness back light module with very high intensity output over two very large surfaces. Variations in intensity over the illuminated area are minimized using light recycling in conjunction with the reflective diffusers and collimating optics. Precision collimators eliminate light beyond a defined angle, as required in tiled or monolithic flat-panel LCDs with predetermined display specifications.

14 Claims, 7 Drawing Sheets

BACK LIGHT ASSEMBLY FOR USE WITH BACK-TO-BACK FLAT-PANEL DISPLAYS

Matter enclosed in heavy brackets [ ] appears in the original patent but forms no part of this reissue specification; matter printed in italics indicates the additions made by reissue.

*This application is a continuation reissue application of application Ser. No. 11/882,394 filed Aug. 1, 2007, now Re. 43,125, which in turn is a divisional reissue application of application Ser. No. 11/154,995 filed Jun. 17, 2005, now Re. 40,355, which in turn is a reissue application of U.S. Pat. No. 6,578,985.*

*This continuation reissue application is one of four related reissue applications for the reissue of U.S. Pat. No. 6,578,985. The reissue applications are Ser. No. 13/329,051 (the present reissue application), application Ser. No. 11/882,394 (the parent reissue application), now Re. 43,125, application Ser. No. 11/154,995 (the grandparent reissue application), now Re. 40,355, and application Ser. No. 11/882,393 (another divisional reissue application of application Ser. No. 11/154,995), now Re. 42,975.*

This application is related to U.S. patent application Ser. No. 09/368,921 filed Aug. 6, 1999 (*now U.S. Pat. No. 6,657,698*); U.S. patent application Ser. No. 09/406,977, filed Sep. 28, 1999 (*now U.S. Pat. No. 6,417,832*); U.S. patent application Ser. No. 09/407,619, filed Sep. 28, 1999 (*now U.S. Pat. No. 6,447,146*); U.S. patent application Ser. No. 09/407,620, filed Sep. 28, 1999 (*now U.S. Pat. No. 6,341,879*); and U.S. patent application Ser. No. 09/490,776, filed Jan. 24, 2000 (*now U.S. Pat. No. 6,680,761*), all of which are included herein by reference. In addition, this application is related to U.S. Pat. Nos. 5,661,531, 5,867,236 and 5,903,328, all of which are also included herein by reference. These [copending] applications and issued patents are all commonly assigned to the assignee of the present application.

FIELD OF THE INVENTION

This invention pertains to back light assemblies for flat-panel displays and, more particularly, to a back light module with a single array of lamps that produces high intensity, collimated light in two directions suitable for use with large, back-to-back, tiled flat-panel displays.

BACKGROUND OF THE INVENTION

Flat-panel displays (FPDs) made in accordance with known active matrix (e.g., TFT, etc.) liquid crystal display technologies (e.g., AMLCD) are typically mounted in front of a back light module which contains an array of fluorescent lamps. AMLCD flat-panel displays of this type have been increasing in size by about 1 to 2 inches diagonal, yearly. The median size in 1999 for use in desktop PCs was about 15 inches diagonal viewing area. A few very large displays are made in the range of 20 to 28 inches diagonal. Tiled AMLCD FPDs may be made in the range of 40 inches diagonal, as described in [copending] U.S. patent applications Ser. Nos. 09/368,921 (*now U.S. Pat. No. 6,657,698*) and 09/490,776 (*now U.S. Pat. No. 6,680,761*). Tiled FPDs, as described in U.S. Pat. No. 5,661,531, require extremely intense back light sources with highly collimated light, masked optical stacks, and pixel apertures that may have low emitted light efficiency. Thus, lighting with unusually high intensity ranges of 50,000 to 150,000 nits is desirable. Also, intensity uniformity over the very large areas of tiled FPDs is very important. Unique back light designs, including temperature control features, are necessary to achieve such high intensities at reasonable power consumption.

Maintaining bright (i.e., high intensity) and uniform illumination of the display over its entire active area is difficult to do. The intensity required for some applications and, in particular, that required for large, tiled, seamless flat-panel LCD displays, causes the lamps to produce a significant amount of heat. In addition, since fluorescent lamps are designed to run most efficiently at an elevated temperature, it is desirable to operate them at or near their ideal design temperature, which is usually about 50 to 60 degrees Centigrade.

Small, edge-lit back light modules, such as those used in notebook or laptop PCs, do not produce sufficient brightness for use in a large area display, nor are they capable of illuminating that large an area uniformly. Thus, it is [necessary] *preferable* to illuminate these larger areas with an array of large fluorescent lamps. The number of lamps required depends on the size of the area to be illuminated and the display brightness requirements. A large area display generally requires multiple lamps to illuminate it properly. A large area display that can be viewed from two sides (i.e., a back-to-back display) requires proportionally more lamps, as well as unique design features to achieve the desired intensities and maintain optimized lamp efficiency through temperature control of the lamps.

Since most displays are designed to be wider than they are tall, it is advantageous, from a reliability and power perspective, to place the lamps in a horizontal orientation. This typically results in the use of fewer lamps and, consequently, lower power consumption, since fewer lamp cathodes are present. The resulting preferred designs orient lamp tubes horizontally, one above the other with predetermined, preferred spacing relationships to each other and to each of the back-to-back displays, one disposed on each side of the lamp array.

It is, therefore, a principal object of the invention to provide a back light module designed to illuminate back-to-back displays.

It is an additional object of the invention to provide a back light module for use with large flat panel displays, either monolithic or tiled.

It is another object of the invention to provide a back light module designed to provide a high intensity light output.

It is a further object of the invention to provide a back light module capable of delivering highly collimated light.

It is an additional object of the invention to provide a back light module having a very high operating efficiency.

It is a still further object of the invention to provide a back light module having a cooling structure to maintain a substantially uniform operating temperature.

It is yet another object of the invention to provide a back light module utilizing an array of horizontally-mounted fluorescent tubes.

It is an additional object of the invention to provide a back light module incorporating a cavity to maximize and control light recirculation.

It is another object of the invention to provide a back light assembly incorporating diffusers, collimators and brightness-enhancing films (BEFs).

It is a further object of the invention to provide a back light assembly suitable for illuminating large, back-to-back, tiled flat-panel displays having visually imperceptible seams.

SUMMARY OF THE INVENTION

In accordance with the present invention, there is provided a back light module which uniformly distributes luminance to back-to-back flat-panel, liquid crystal displays (LCDs) simultaneously. Fluorescent lamps are used due to their high efficiency. However, luminance, efficiency, and lamp life of fluorescent lamps are all functions of lamp tube temperature. The present invention provides an apparatus and method for achieving luminance uniformity and a high degree of light collimation in back-to-back displays with one single back light module source.

In particular, a constant and uniform luminance output of the back light module is obtained through appropriate selection of lamps, optimization of back light module geometry and use of additional optical components. A preferred balance of lamps, lamp spacing, diffuser and collimating optics is chosen to produce a high brightness back light module with very high, uniform intensity output over very large surface areas. Light is recycled from one display module to the other as the light is reflected from each of the display's optical stacks. The optical stacks of the two display modules typically include polarizers, masks, diffusers etc. In addition, light is reflected from the light collimating optics and the light enhancing and diffusing films also typically present in the optical stacks.

This invention provides a method for achieving this goal through selection of combinations of components and appropriate design geometries. A particular application of the inventive back light module is for use in integrating two large, tiled, flat-panel displays having visually imperceptible seams as described in the aforementioned U.S. patent application Ser. Nos. 08/652,032 (*now U.S. Pat. No. 5,867,236*), and [09/368,291] *09/368,921* (*now U.S. Pat. No. 6,657,698*), and U.S. Pat. No. 5,903,328. The back light module system, with thermal enhancements such as those disclosed in U.S. patent application Ser. No. 09/406,977 (*now U.S. Pat. No. 6,417,832*) and applicable controls, such as those disclosed in U.S. patent application Ser. No. 09/407,619 (*now U.S. Pat. No. 6,447,146*), provides for an efficient, reliable, large area, high intensity light source usable with back-to-back flat-panel displays.

Additionally, optimum geometries are determined for the purpose of maximizing light output at high efficiencies, while minimizing luminance gradients across the two displays. These optimum geometries are also determined for maximizing light output using brightness enhancing films (BEFs) and light recycling.

Finally, precise collimators such as that disclosed in U.S. patent application Ser. Nos. 09/024,481 (*now U.S. Pat. No. 6,152,580*) and 60/177,447 (*now U.S. Pat. No. 6,654,449*), eliminate light beyond a defined cut-off angle for each flat panel display, as required in a tiled flat-panel LCD.

It will be obvious that while the back light assembly of the invention is optimized for use with tiled, AMLCD flat-panel displays, it may also be used with monolithic and monolithic-like displays.

BRIEF DESCRIPTION OF THE DRAWINGS

A complete understanding of the present invention may be obtained by reference to the accompanying drawings, when considered in conjunction with the subsequent, detailed description, in which:

FIG. 2b is a plan view of the multiple lamp back light shown in FIG. 2a;

For purposes of both clarity and brevity, like elements and components will bear the same designations and numbering throughout the figures.

DESCRIPTION OF THE PREFERRED EMBODIMENT

Generally speaking, the invention features an apparatus and a method for controlling the luminance level, luminance uniformity and collimation of light exiting a large area back light suitable for use with back-to-back flat-panel displays. The back light assembly is suitable for use with large, tiled, flat-panel displays which require high luminance levels and a precise, predetermined degree of collimation. In addition, the present invention provides an optimum design taking into account efficiency, cooling, luminance and image quality for use in integrating back-to-back flat-panel displays with a single light source. The design is useful with tiled flat-panel displays and large monolithic or monolithic-like LCD displays.

Figure 1:
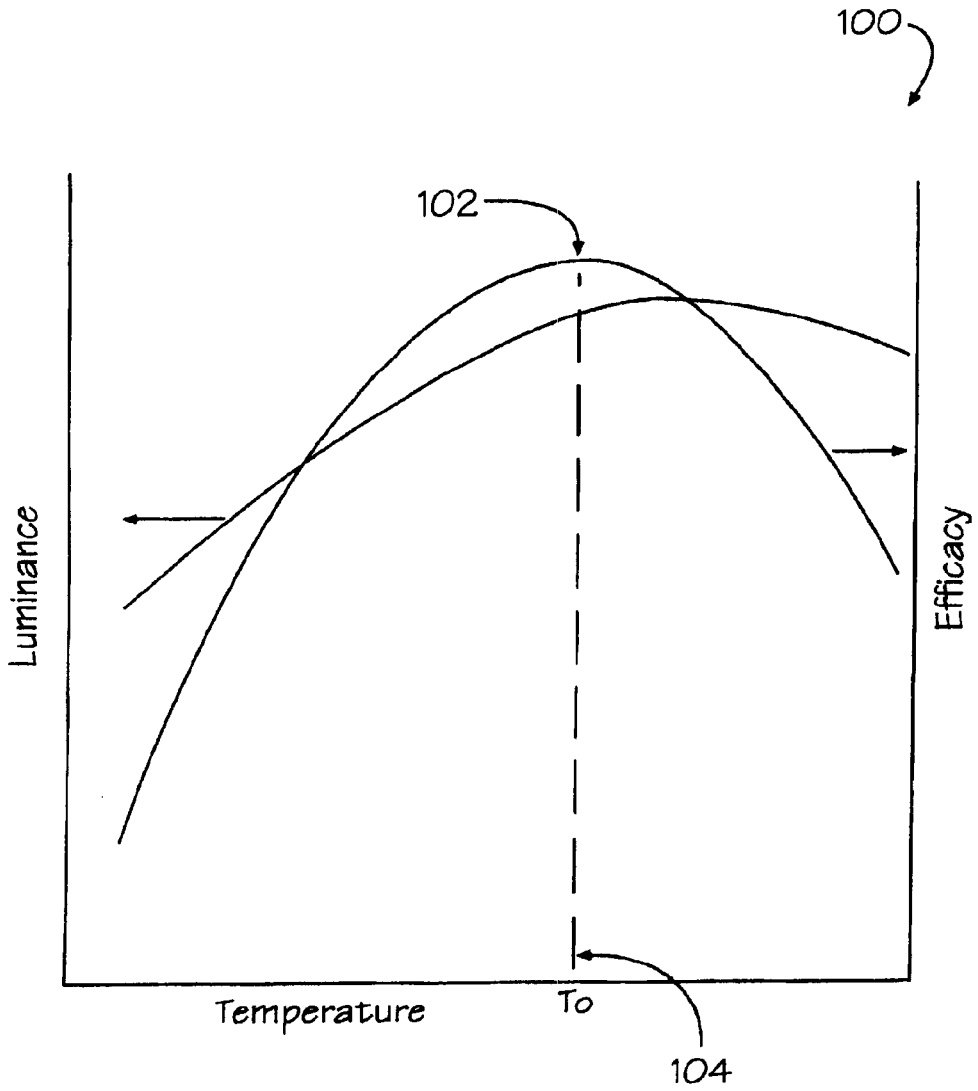
FIG. 1 is a graph of luminance vs. temperature in a typical fluorescent lamp.

Referring first to FIG. 1, there is shown a graph 100 of the light output (i.e., luminance) and efficiency (i.e., efficacy) of a typical fluorescent lamp as a function of temperature. Fluorescent lamps generally operate most efficiently at a predetermined, optimum lamp tube wall temperature. Maximum brightness usually occurs near the point 102 of maximum efficacy.

The ideal temperature $T_o$ 104 may then be determined from the temperature axis of graph 100. The ideal temperature 104 is determined by the lamp construction, particularly dependent on such parameters as the phosphor, cathode construction and the mercury vapor pressure. The most efficient lamps 128 are generally the class of fluorescent lamps of the hot cathode type. Hot cathode lamps have a preheat cycle during which the cathodes are heated, thereby causing easier ignition (i.e., striking) of the gas within the lamp.

Figure 2A:
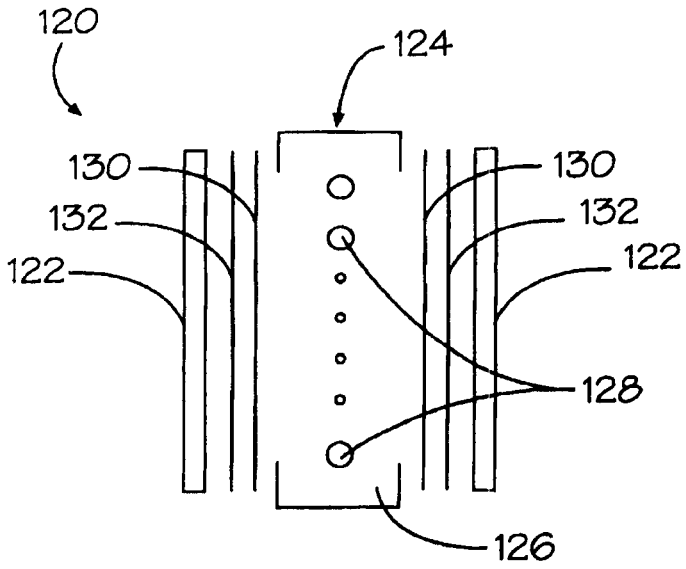
FIG. 2a is a schematic, cross-sectional view of a multiple lamp back light simultaneously illuminating back-to-back displays.

Now referring to FIG. 2a, there is shown a side view 120 of back-to-back flat-panel displays 122 and its back light assembly 124. The back light assembly 124 consists of a light box cavity 126, an array of fluorescent lamps 128, and light diffusers 130. Lamps 128 are cooled by fans (not shown).

Some display applications require additional optical components 132 to enhance certain characteristics of the exiting light. For example, tiled, flat-panel LCD displays require highly collimated light. The additional optical components 132 required to collimate the light may be somewhat inefficient. This necessitates that a high luminance be produced by the back light assembly 124.

Figure 2B:
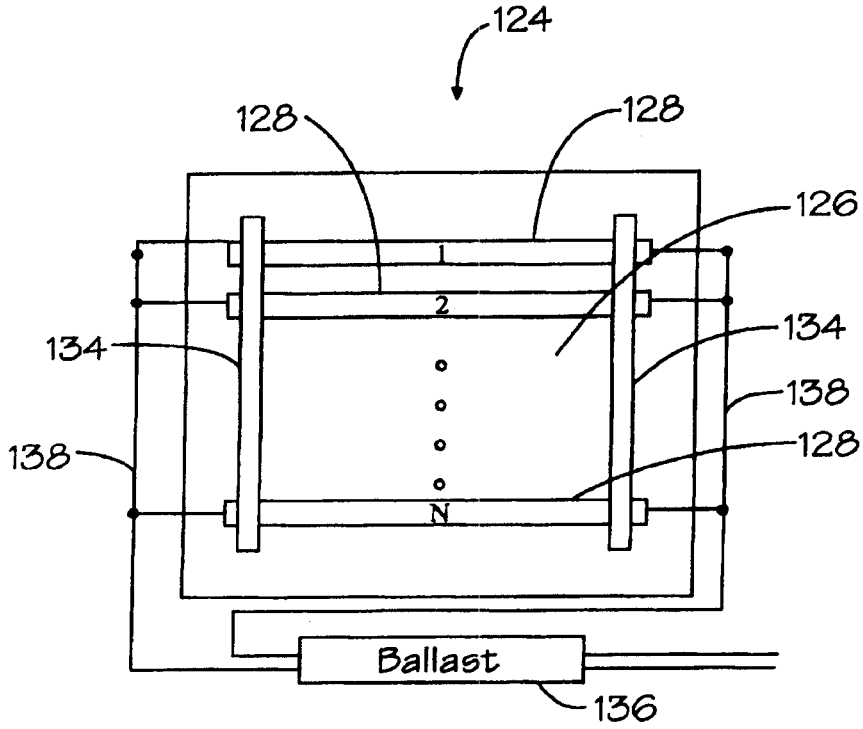

Referring now also to FIG. 2b, there is shown a front view of the back light assembly 124 of FIG. 2a. The lamps 128 are held in the light box cavity 126 by lamp holders 134. The lamps 128 are wired to the ballast 136 by a wiring harness 138. The ballast 136 supplies high frequency (usually 20-30 KHz) AC power to the lamps 128. Efficient, high-frequency electronic ballasts are well known to those skilled in the art and any suitable unit may be chosen for use with the instant invention, the ballast forming no part thereof.

It will be obvious that temperature sensing devices, fan speed control circuitry, lamp dimming controls, heat sinks and other such temperature control devices and methods which are known to those skilled in the art could be used in conjunction with the back light of the present invention to help control the surface temperatures of the lamps 128. As an example, the lamp holder 134 can be a heat sink with an attached thermistor (not shown) to measure lamp temperature and its output used to regulate the voltage to one or more fans thereby regulating fan speed, or the voltage may be used to regulate the output of dimming ballast 136.

Figure 3:
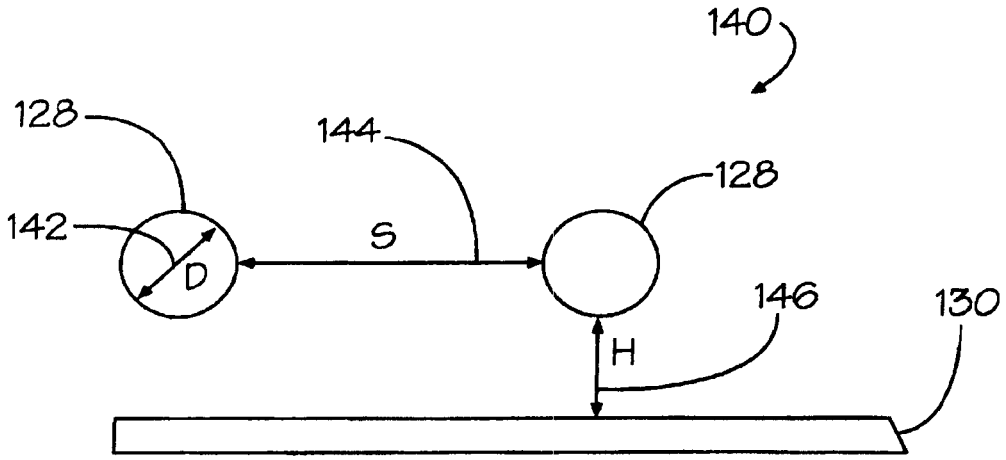
FIG. 3 is a schematic diagram illustrating lamp and diffuser spacing relationships.

Referring now to FIG. 3, there is shown a schematic diagram 140 of a portion of a back light assembly where certain critical dimensions and/or distances are identified. Two lamps 128, each having a diameter D 142, are arranged adjacent one another, spaced apart a distance S 144. Lamps 128 are positioned a distance H 146 away from the diffusers 130. These dimensions may be used in design calculations in manners well known to those skilled in the art.

If lamps 128 are assumed to be line sources, luminance may be calculated according to the equation:

$$A = \tan^{-1}\frac{\frac{D}{4}}{H + \frac{D}{2}}$$

Assuming that the required luminance A is known, the number of lamps may readily be calculated.

Figure 4:
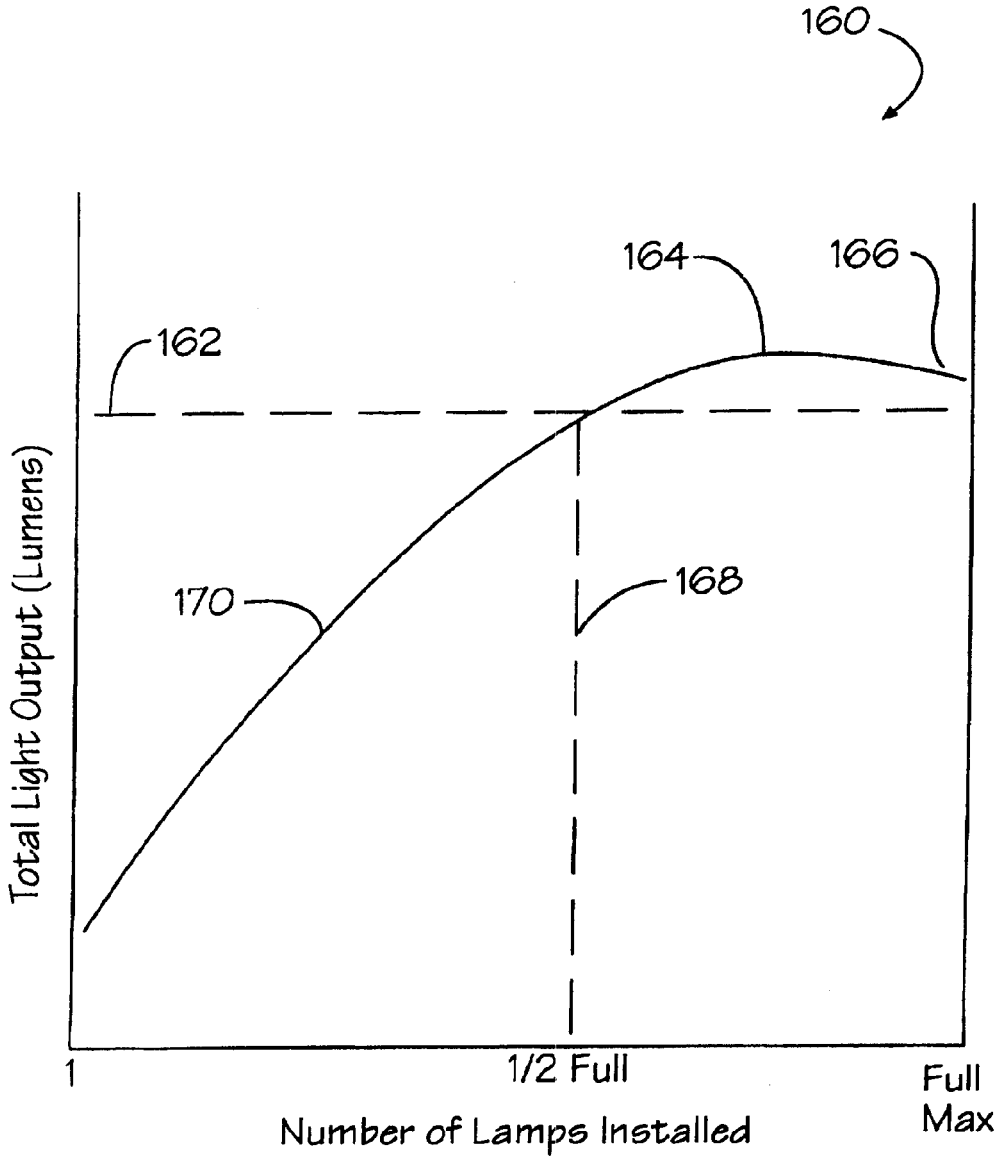
FIG. 4 is a graph showing light output as a function of the number of lamps installed.

Referring now to FIG. 4, there is shown a graph 160 illustrating the effect of varying the S 144 and H 146 dimensions on the light output from a back light assembly. Having this information, the required number of lamps 128 of a predetermined size (diameter) D 142 required to produce the necessary luminance may be calculated.

The curve of total light output from the back light cavity 126 is a function of the number of lamps 168 installed. The desired light level 162 is also shown. It will be noted that, as the number of lamps increases, the light output increases until a maximum illumination 164 occurs prior to reaching the point of maximum lamp capacity 166. Also, as more lamps 168 are used, or the lamps are spaced closer together, they block light from each other. The number of lamps 168 corresponding to the desired light output 162 is also shown.

It is also necessary that the diffusers 130 be highly efficient, but not of high transmissivity. One diffuser 130 behaves as a diffuser for the display on its side of the lamps 128. However, the same diffuser 130 behaves as a reflector for the opposite display. Since the collimating films 182 & 184 (BEFs) require recirculating light in order to be efficient, the diffusers 130 must both transmit and reflect light. A transmission of 50-75% has been found to be effective in this application.

Figure 7:
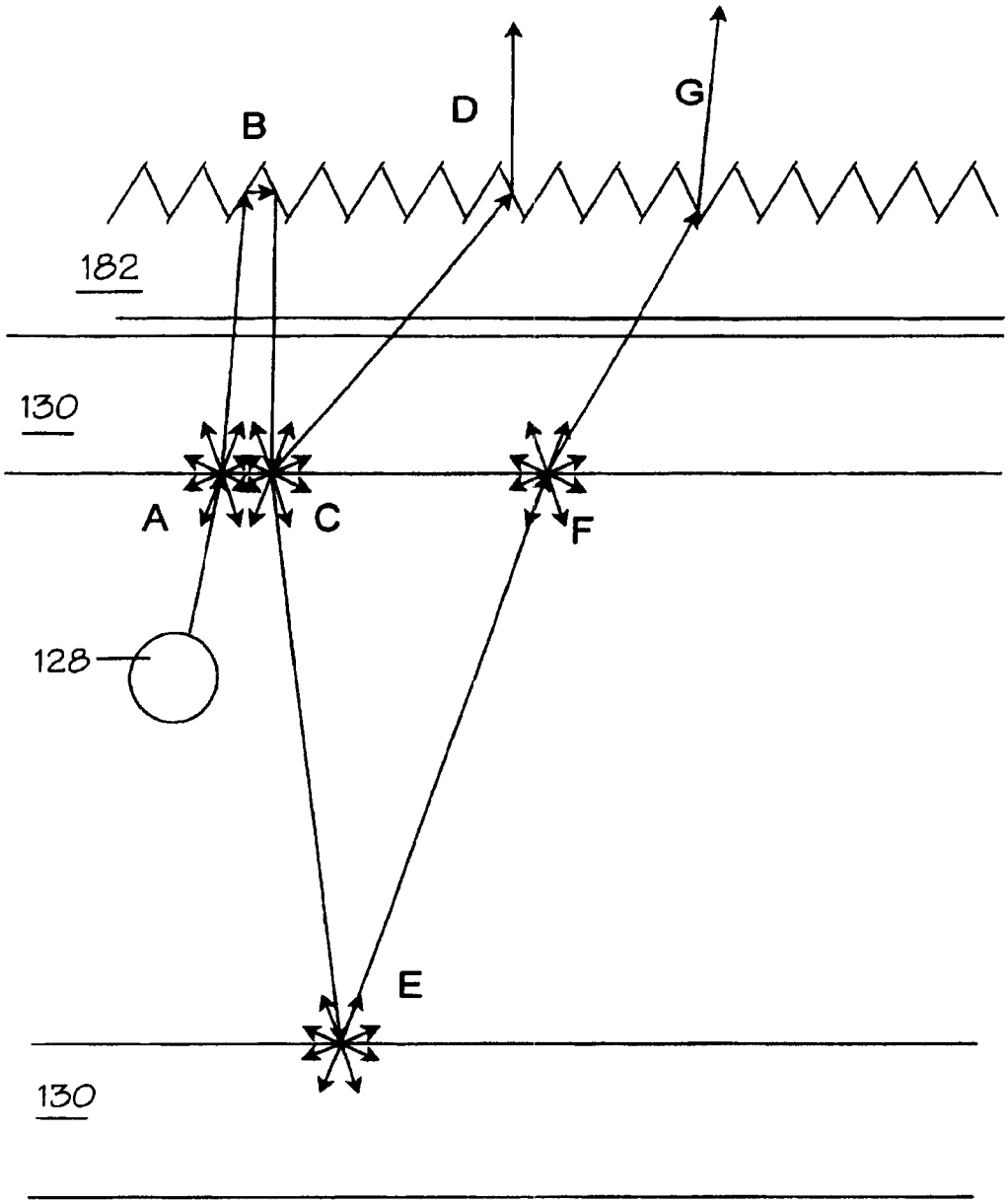
FIG. 7 is a ray diagram showing typical reflections of light rays between diffusers and light collimating (i.e. brightness enhancing) films.

Now referring to FIG. 7, several light rays are traced to explain the interaction between the diffusers 130 and the collimating films 182 and 184. The efficiency of these collimating films 182, 184 are conditional on a good optical coupling with their reflective surfaces. Consider a light ray that emanates from the lamp 128 and strikes the upper diffuser 130 at a point A. If the diffuser 130 is, for example, 60% transmissive, then 60% of the light will be transmitted through the diffuser 130 and result in a "Lambertian" distribution (i.e., be uniformly distributed at all angles relative to the surface of diffuser 130) of light aimed at the collimating film 182. However, 40% of the light is reflected (also in a Lambertian distribution) toward the lower diffuser 130. One light ray from the transmitted light at point A heads toward point B on the collimating film. The angle of incidence (for example, less than 60° from normal) of this light ray is such that it is reflected back toward the diffuser at point C. At point C, 40% of the light ray is reflected back toward the collimating film 182. This type of reflection is highly efficient compared to light that re-enters the lamp cavity. Light which enters the light cavity must cross two diffuser/air interfaces (thus losing light) and some may be absorbed or scattered by the lamps.

Figure 5:
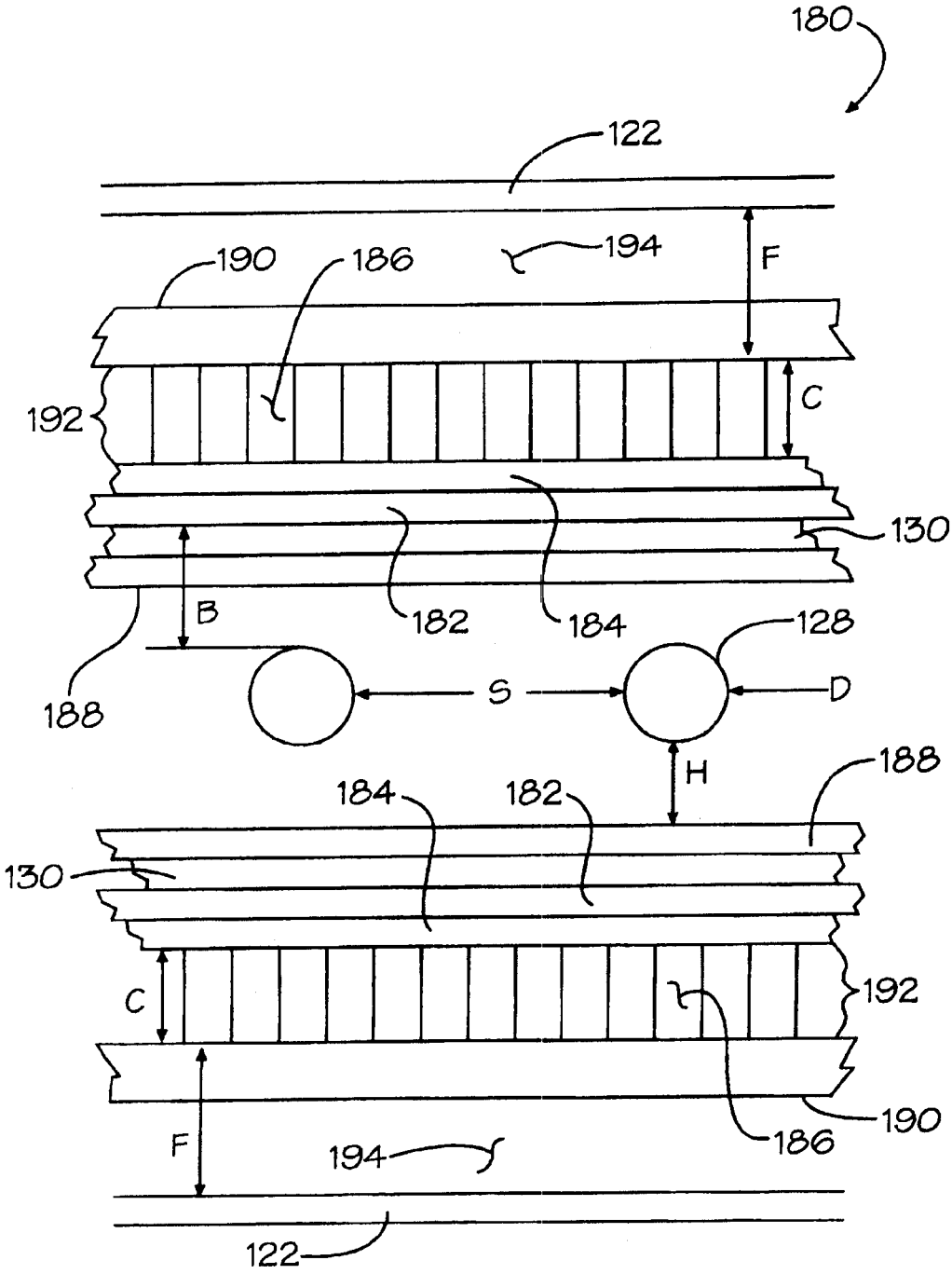
FIG. 5 is a schematic, sectional view of a back light assembly in use with back-to-back flat panel displays in accordance with the present invention.

Consider now another light ray reflected from point C, and is directed toward point D. This light ray has a favorable angle of incidence (for example, 60-85°) and is sent forward to the next collimating film 184 (FIG. 5) and eventually the LCD tile 194 (FIG. 5). Some of the reflected light from point C is sent to the lower diffuser 130 at point E. Some of this light will end up in the lower display and some will be reflected from the lower diffuser 130 and be sent toward point F and some of this light will make it to point G on the collimating film 182 and be sent forward to the upper display. As can be seen, light rays will continue to be reflected between the elements 130 and 182.

The nature of the efficient coupling of reflected light between the collimating film 182 and the adjacent diffuser 130 improves the forward gain of the collimated light output. The key to the collimation efficiency is the highly efficient, but relatively low transmission diffuser.

A good approximation of the total light output of the back light assembly, without considering collimation and related light re-circulation, can be obtained by considering the geometry. A lamp tube 128 produces light rays substantially uniformly over 360 degrees. The light exits forward toward a first display, is absorbed by neighboring lamps or exits rearward and hits the alternative display. The light reflecting off one display either exits through the lamp array and into the second display or is absorbed into the array of fluorescent lamps.

The light absorbed by a neighboring lamp can be expressed by the angle of light rays leaving the lamp:

$$\phi_1 = \sin^{-1}\left(\frac{D}{S + D}\right)$$

The space S is given by the number of lamps N housed in the width W of the back light cavity, and is:

$$S = \frac{W - ND}{N - 1}$$

The light exiting forward is given by its angle:

$$\phi_{forward} = 180 - \phi_1$$

The light exiting rearward is the same as that exiting forward; thus, the total light exiting from the back light assembly is:

$$L = \frac{Nl}{360}\{\phi_{forward} + \phi_{back}$$

where 1 is the total light output of one lamp. The results are plotted in FIG. 4.

Since the power consumed by each lamp 128 is constant, efficiency is related to light output and the number of lamps. The curve 170 is nearly linear until the number of lamps approaches one-half of the maximum that can be installed in the allotted space. It is desirable then to choose a light output design point near this inflection point. Thus, an optimum number of lamps 168 are shown in FIG. 4.

Referring now to FIG. 5, there is shown a schematic, cross-sectional view 180 of the inventive back light assembly with back-to-back displays. Many optical components typically used in both single and back-to-back configurations are shown.

Light collimating optics 132 consist of crossed BEFs 182 and 184 and a collimator 186. The diffusers and collimating optics 132 are sandwiched between glass plates 188 and 190. These plates 188 and 190 may be optically clear, with enough stiffness to support the film optics over the expanse needed. Flat-panel displays 122 are placed in front of the optics assemblies 192 and separated by a distance F, leaving air spaces 194. These air spaces 194 are vented to ambient air to allow for further cooling of the displays 122.

As was previously stated, the collimating optics use BEFs which accept light at high angles of incidence and send light at near normal angles of incidence back towards the back light assembly for recycling. It is desirable to have as much reflective area available as possible for the BEFs. However, more lamps produce more light output. The first pass design choice for lamp spacing S is increased slightly. It has been found that increasing lamp spacing such that the number of lamps is reduced by approximately 10% provides satisfactory results. The coupling of light into the BEFs 182 and 184 is also affected by the distance B that they are placed from the lamps 128.

The luminance output of the BEFs increases with proximity to the lamps, but luminance uniformity decreases with proximity to the lamps. For practical purposes, a reasonable space H 146 is required between the lamps 128 and the glass optics holder for air flow to cool the cavity 126 (FIG. 2a).

The preferred diffuser 130 is a high efficiency, low transmission diffuser which is chosen to have a near Lambertian distribution in order to couple a maximum amount of light into the BEFs 182 and 184 and to permit a maximum amount of recycling in the back light cavity 126. The diffuser 130 must efficiently reflect light, it must have high transmission efficiency, and it must produce a Lambertian distribution of light. Additionally, the lamps are not 100% absorbing. Consequently, fine tuning is necessary in the design parameters of lamp spacing, back plane space, and BEF spacing to the lamps.

The collimators 186, also described in detail in the aforementioned U.S. Pat. No. 5,903,328, consist of open hexagonal cells in a honey comb configuration, coated with a highly light-absorbing paint. The aspect ratio of cell width to cell depth determines the cut-off angle or collimation angle.

The use of a sharp cut-off collimator is preferred in a seamless, tiled, flat-panel display. Non-tiled, large monolithic or monolithic-like displays do not require cut-off angles as sharp as those for tiled displays. A more efficient collimator design which may be applied is disclosed in United States Provisional Patent Application Serial No.60/177,447. Unfortunately, collimators, having a physical structure, create a shadow image which can be seen on the display. To prevent imaging of the collimator, the display is placed a predetermined distance F away so that cell images overlap, or are defocused, and therefore are not visible to the viewer.

Figure 6:
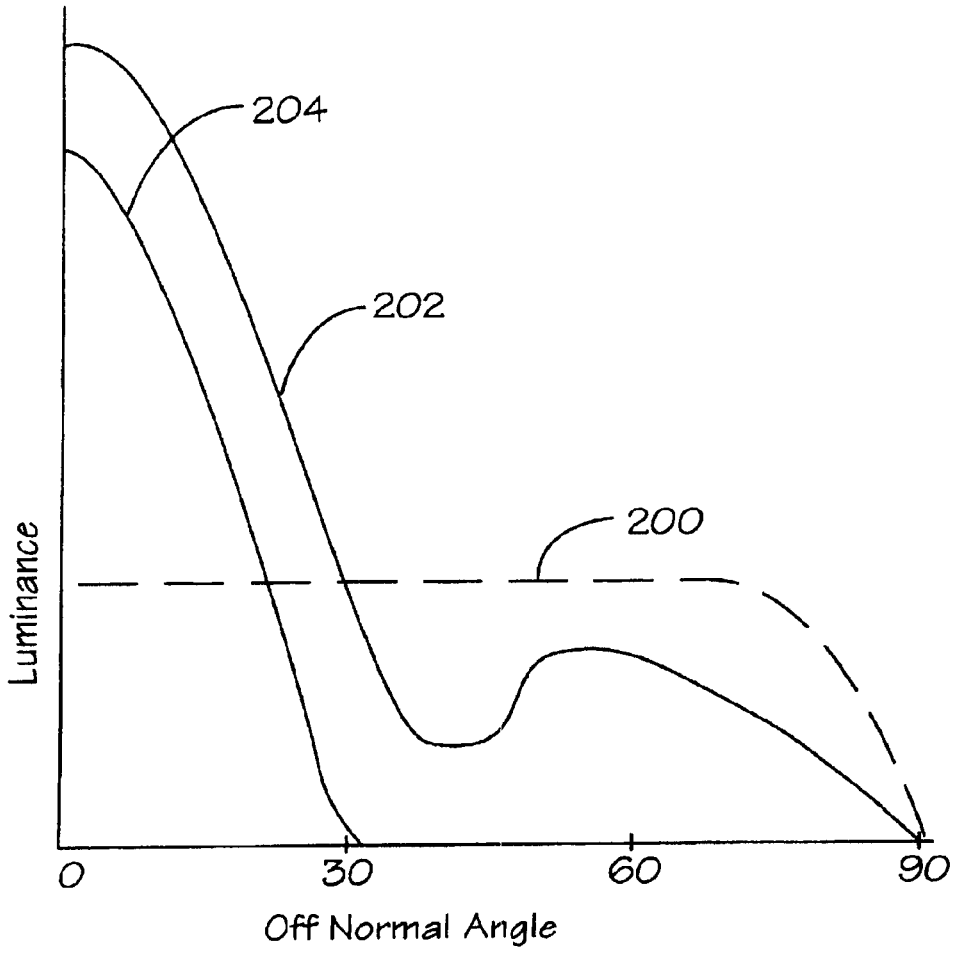
FIG. 6 is a graph showing luminance as a function of deviation from a normal caused by the collimation attributes of the optics.

FIG. 6 depicts the degree of collimation or angular distribution of light emitted from each of the optical components. The diffuser 130 emits a Lambertian distribution 200, as stated hereinabove. The BEFs 182, 184 focus light forward in a distribution 202 that has a theoretical forward gain of 2.2 for the type used herein. Actual achieved forward gain is about 1.9. The BEF distribution 202 has a significant amount of light energy remaining beyond the cut-off angle (~301 in the preferred embodiment) that is undesirable for use with seamless, tiled, flat-panel displays.

The collimator 186 eliminates such unwanted light by cutting off light beyond the collimation angle, as shown by its emission distribution 204. The surface absorption of the collimator cell must be sufficient to prevent luminance of more than 1% of normal luminance beyond the collimation angle.

Brightness levels far exceeding existing industry capability have been achieved with the inventive design. Luminance values exceeding 100,000 nits (candelas/square meter) have been reached. Reasonable designs with exceptional efficiency have been prototyped with luminance output exceeding 50,000 nits, a uniformity of luminance of 10% at an efficiency better than any currently available commercial back light unit, even those achieving lower brightness levels.

Since other modifications such as in optical configurations can be made to fit particular operating specifications and requirements, it will be apparent to those skilled in the art that the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

[1. A high-output back light module for use with two back-to-back flat-panel displays, comprising:

a) a housing having an open front and an open back and defining a lamp cavity, said lamp cavity having substantially solid, optically-reflective side walls;

b) an array of lamps disposed within said lamp cavity; and c) lamp control means operatively connected to at least one lamp of said array of lamps to provide power thereto and to optimize light output therefrom;

wherein said housing, said lamp cavity and said lamp array are disposed intermediate two back-to-back flat-panel displays at a predetermined distance from each of said two back-to-back flat-panel displays.]

[2. The high-output back light module for use with back-to-back flat-panel displays as recited in claim 1, wherein said lamp cavity is substantially rectangular and oriented such that the longer side of said rectangle is disposed horizontally.]

[3. The high-output back light module for use with back-to-back flat-panel displays as recited in claim 2, wherein said array of lamps is disposed horizontally within said lamp cavity.]

[4. The high-output back light module for use with back-to-back flat-panel displays as recited in claim 2, wherein said lamp array comprises fluorescent lamps.]

[5. The high-output back light module for use with back-to-back flat-panel displays as recited in claim 4, wherein said fluorescent lamps comprise hot cathode fluorescent lamps.]

[6. The high-output back light module for use with back-to-back flat-panel displays as recited in claim 5, further comprising at least one from group: collimating means, diffuser means and brightness enhancing films (BEFs) disposed intermediate said housing, and at least one of said back-to-back flat-panel displays.]

[7. The high-output back light module for use with back-to-back flat-panel displays as recited in claim 6, wherein said lamp array is defined by parameters comprising the number of lamps in said lamp array, the type of lamps, the lamp diameter and the inter-lamp spacing, and wherein at least one of said parameters is chosen to optimize light. output from said lamp array disposed in said lamp cavity.]

[8. The high-output back light module for use with back-to-back flat-panel displays as recited in claim 7, wherein lamps of said array of lamps are spaced apart from one another at a predetermined, inter-lamp spacing; said array of lamps being disposed a predetermined, optimized distance from each of said back-to-back flat-panel displays, said distance being functionally related to at least one of the parameters: lamp diameter, lamp type, inter-lamp spacing, collimator means, BEFs and diffusers.]

[9. The high-output back light module for use with back-to-back flat-panel displays as recited in claim 8, wherein said inter-lamp spacing between each lamp of said array of lamps is substantially equal.]

[10. The high-output back light module for use with back-to-back flat-panel displays as recited in claim 6, wherein said collimating means comprises a collimator having an array of open cells having a regular, repeating cell geometry, said geometry defining a cell width, each of said cells having a thickness defining a cell depth.]

[11. The high-output back light module for use with back-to-back flat-panel displays as recited in claim 10, wherein said cell width and said cell depth have an aspect ratio therebetween, defining a cut-off angle.]

[12. The high-output back light module for use with back-to-back flat-panel displays as recited in claim 11, wherein said cell width and said cell depth define cell walls.]

[13. The high-output back light module for use with back-to-back flat-panel displays as recited in claim 12, wherein said cell walls are coated with a light-absorbing coating.]

[14. The high-output back light module for use with back-to-back flat-panel displays as recited in claim 12, wherein said light-absorbing coating comprises flat, black paint.]

[15. The high-output back light module for use with back-to-back flat-panel displays as recited in claim 8, further comprising a high efficiency exit diffuser placed proximate at least one of said open front and open back of said housing.]

[16. The high-output back light module for use with back-to-back flat-panel displays as recited in claim 15, wherein said high efficiency exit diffuser produces a substantially Lambertian distribution and efficiently reflects light for recirculation.]

[17. The high-output back light module for use with back-to-back flat-panel displays as recited in claim 16, wherein said high efficiency exit diffuser is disposed at a predetermined distance from said lamps whereby luminance gradients are reduced across said illuminated areas below a predetermined value.]

[18. The high-output back light module for use with back-to-back flat-panel displays as recited in claim 17, further comprising brightness-enhancing means disposed proximate said high efficiency exit diffuser.]

[19. The high-output back light module for use with back-to-back flat-panel displays as recited in claim 18, wherein said brightness-enhancing means comprises at least two brightness-enhancing films (BEFs) for collimating light, disposed intermediate said lamps and at least one of said back-to-back displays, said BEFs comprising parallel V-grooves having a predetermined wall angle relative to a first surface thereof, said BEFs being arranged substantially orthogonally to one another.]

[20. The high-output back light module for use with back-to-back flat-panel displays as recited in claim 19, wherein said first surfaces of said BEFs face away from said array of lamps, said BEFs interacting with said high efficiency exit diffusers to enhance the forward gain of light collimated by said collimating means.]

[21. The high-output back light module for use with back-to-back flat-panel displays as recited in claim 1, wherein said lamp control means comprises lamp temperature regulation means adapted to maintain the surface temperature of each of said lamps within a predetermined range of operating temperatures.]

[22. The high-output back light module for use with back-to-back flat-panel displays as recited in claim 21, is wherein said lamp temperature regulation means comprises at least one from the group:

heat sinks, dimming controls and fan speed controls.]

[23. The high-output back light module for use with back-to-back flat-panel displays as recited in claim 22, wherein at least one of said dimming controls and fan speed controls comprises a temperature sensor proximate at least one of said array of lamps.]

[24. The high-output back light module for use with back-to-back fiat-panel displays as recited in claim 23, wherein said temperature sensor generates a variable output voltage representative of the temperature of said at least one of said array of lamps.]

[25. The high-output back light module for use with back-to-back flat-panel displays as recited in claim 24, wherein said temperature sensor generates a variable output voltage representative of the temperature of at least one of said lamps, said variable output voltage controlling the speed of a cooling fan.]

[26. The high-output back light module for use with back-to-back flat-panel displays as recited in claim 24, wherein said temperature sensor generates a variable output voltage representative of the temperature of at least one of said lamps, said variable output voltage controlling the output of a dimming ballast.]

[27. The high-output back light module for use with back-to-back flat-panel displays as recited in claim 24, wherein said temperature sensor comprises a thermistor.]

[28. The high-output back light module for use with back-to-back flat-panel display as recited in claim 1, wherein at least one of said flat-panel displays comprises one from the group: monolithic display, monolithic-like display, tiled display.]

*29. A back light module comprising:*

*a first diffuser that has a first side and a second side; and*

*a first brightness enhancing film that has a third side and a fourth side,*

*the first diffuser and the first brightness enhancing film being configured such that:*

*a first light is transmitted through the first diffuser and enters the first brightness enhancing film from the fourth side;*

*a second light arises by a first entrance of the first light to the first brightness enhancing film;*

*the second light is transmitted inside the first brightness enhancing film;*

*the second light is reflected by at least two locations of the third side;*

*a third light arises by a first reflection of the second light by the at least two locations of the third side;*

*a fourth light that emerges out from the fourth side enters the first diffuser from the first side;*

*a fifth light arises by a second entrance of the fourth light to the first diffuser;*

*a second reflection of the fifth light by the second side results in a sixth light; and*

*the sixth light enters the first brightness enhancing film from the fourth side.*

*30. The back light module according to claim 29, further comprising:*

*a second diffuser that has a fifth side and a sixth side,*

*a seventh light arises when the sixth light arises, and*

*the seventh light being reflected by the fifth side.*

*31. The back light module according to claim 30, wherein the second diffuser produces a substantially Lambertian distribution.*

*32. The back light module according to claim 29, further comprising:*

*a lamp.*

*33. The back light module according to claim 30, further comprising:*

*a lamp that is disposed between the first diffuser and the second diffuser.*

*34. The back light module according to claim 29, further comprising:*

*a lamp that emits an eighth light,*

*the first diffuser and the lamp being configured such that the eighth light enters the first diffuser.*

*35. The back light module according to claim 29, further comprising:*

*an array of lamps.*

*36. The back light module according to claim 35, wherein*

*one lamp of the array of lamps emits an eighth light,*

*the one lamp and the first diffuser being configured such that the eighth light enters the first diffuser.*

*37. The back light module according to claim 30, wherein*

*a reflection of the seventh light by the fifth side results in a ninth light.*

*38. A flat panel apparatus, comprising:*

*a first diffuser that has a first side and a second side; and*

*a first brightness enhancing film that has a third side and a fourth side,*

*the first diffuser and the first brightness enhancing film being configured such that:*

*a first light is transmitted through the first diffuser and enters the first brightness enhancing film from the fourth side;*

*a second light arises by a first entrance of the first light to the first brightness enhancing film;*

*the second light is transmitted inside the first brightness enhancing film;*

*the second light is reflected by at least two locations of the third side;*

*a third light arises by a first reflection of the second light by the at least two locations of the third side;*

*a fourth light that emerges out from the fourth side enters the first diffuser from the first side;*

*a fifth light arises by a second entrance of the fourth light to the first diffuser;*

*a second reflection of the fifth light by the second side results in a sixth light; and*

*the sixth light enters the first brightness enhancing film from the fourth side.*

*39. A flat panel display comprising:*

*a first diffuser that has a first side and a second side; and*

*a first brightness enhancing film that has a third side and a fourth side,*

*the first diffuser and the first brightness enhancing film being configured such that:*

*a first light is transmitted through the first diffuser and enters the first brightness enhancing film from the fourth side;*

*a second light arises by a first entrance of the first light to the first brightness enhancing film;*

*the second light is transmitted inside the first brightness enhancing film;*

*the second light is reflected by at least two locations of the third side;*

*a third light arises by a first reflection of the second light by the at least two locations of the third side;*

*a fourth light that emerges out from the fourth side enters the first diffuser from the first side;*

*a fifth light arises by a second entrance of the fourth light to the first diffuser;*

*a second reflection of the fifth light by the second side results in a sixth light; and*

*the sixth light enters the first brightness enhancing film from the fourth side.*

*40. The flat panel display according to claim 39, further comprising:*

*a liquid crystal layer.*

*41. A flat panel display comprising:*

*a liquid crystal layer; and*

*the back light module according to claim 29,*

*the liquid crystal layer being illuminated by a light that emerges out from the back light module.*

*42. The back light module according to claim 29, wherein the first diffuser and the first brightness enhancing film are further configured such that:*

*a tenth light arises by a third entrance of the sixth light to the first brightness enhancing film, and*

*the tenth light emerging out from the third side toward a direction opposite to the fourth side with respect to the third side.*

* * * * *